US006298894B1

(12) United States Patent
Nagamoto et al.

(10) Patent No.: US 6,298,894 B1
(45) **Date of Patent: *Oct. 9, 2001**

(54) HEAT ACTIVATION METHOD OF THERMOSENSITIVE ADHESIVE LABEL AND HEAT-ACTIVATING APPARATUS FOR THE SAME

(75) Inventors: Masanaka Nagamoto, Susono; Morio Yamada, Numazu; Toshinobu Iwata, Oyama-machi, all of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/143,413

(22) Filed: Aug. 28, 1998

Related U.S. Application Data

(62) Division of application No. 08/791,270, filed on Jan. 30, 1997, now Pat. No. 5,846,358.

(30) Foreign Application Priority Data

| | | |
|---|---|---|
| Jan. 30, 1996 | (JP) | 8-034228 |
| Sep. 17, 1996 | (JP) | 8-265102 |
| Jan. 28, 1997 | (JP) | 9-27340 |

(51) Int. Cl.$^7$ .................... B32B 31/00

(52) U.S. Cl. .................... 156/359; 156/378; 156/384; 156/521

(58) Field of Search .................... 156/64, 277, 289, 156/320, 322, 378, 384, 517, 521, 583.1, DIG. 21, DIG. 36, DIG. 51, 358, 359; 73/150 A

(56) References Cited

U.S. PATENT DOCUMENTS

| | | | | |
|---|---|---|---|---|
| 4,427,744 | * | 1/1984 | Hume, III | 428/462 |
| 4,707,211 | | 11/1987 | Shibata . | |
| 4,746,932 | * | 5/1988 | Sato | 156/384 X |

(List continued on next page.)

FOREIGN PATENT DOCUMENTS

| | | |
|---|---|---|
| 0 071 191 | 2/1983 | (EP) . |
| 0 570 740 | 11/1993 | (EP) . |
| 0 637 547 | 2/1995 | (EP) . |
| 1 603 065 | 11/1981 | (GB) . |

OTHER PUBLICATIONS

Patent Abstracts of Japan, vol. 18, No. 669, (M–1725), JP 06 263128, Sep. 20, 1994, Dec. 1994.*

Patent Abstracts of Japan, vol. 18, No. 669, (M–1725), Dec. 16, 1994, JP 06 263128, Sep. 20, 1994.

*Primary Examiner*—Richard Crispino
*Assistant Examiner*—Sue A. Purvis
(74) *Attorney, Agent, or Firm*—Oblon, Spivak, McClelland, Maier & Neustadt, P.C.

(57) ABSTRACT

A heat activation method for activating a thermosensitive adhesive label having a support and a thermosensitive adhesive layer which is formed on the support and is not adhesive at room temperature, so as to make the thermosensitive adhesive layer adhesive with the application of heat thereto, includes the step of bringing the thermosensitive adhesive layer into contact with a surface portion of a heating medium, at least the surface portion of the heating medium being made of a silicone resin and having a peel strength of 2 g/mm or less with respect to the thermosensitive adhesive layer. There is also disclosed a heat-activating apparatus for heat-activating the above-mentioned thermosensitive adhesive label.

2 Claims, 7 Drawing Sheets

U.S. PATENT DOCUMENTS 4,777,079 * 10/1988 Nagamoto et al. .................. 428/212
4,784,714 * 11/1988 Shibata ................................. 156/354
4,996,901 * 3/1991 Fullerton ................................ 83/436
5,053,267 * 10/1991 Ide et al. .............................. 428/195
5,110,389 * 5/1992 Hiyoshi et al. ...................... 156/234
5,248,543 * 9/1993 Yamaguchi et al. ................. 428/195
5,413,651 * 5/1995 Otruba .................................. 156/64
5,689,789 * 11/1997 Moser ................................. 399/331
5,837,340 * 11/1998 Law et al. ........................... 428/36.8
5,846,358 * 12/1998 Nagamoto et al. .................... 156/64

* cited by examiner

HEAT ACTIVATION METHOD OF THERMOSENSITIVE ADHESIVE LABEL AND HEAT-ACTIVATING APPARATUS FOR THE SAME

This application is a divisional of application Ser. No. 08/791,270 filed Jan. 30, 1997, now U.S. Pat. No. 5,846,358.

BACKGROUND OF THE INVENTION

1. Field of the Invention

The present invention relates to a heat activation method of a thermosensitive adhesive label comprising a support, and a thermosensitive adhesive layer which is formed on the support without a liner (i.e., a disposable backing sheet) and is not adhesive at room temperature, so as to make the thermosensitive adhesive layer adhesive with the application of heat thereto. More particularly, the present invention relates to the heat activation method of the above-mentioned thermosensitive adhesive label, comprising the step of bringing the thermosensitive adhesive layer of the thermosensitive adhesive label into contact with a heating medium of which surface portion comprises a silicone resin.

In addition, the present invention also relates to an apparatus for heat-activating the above-mentioned thermosensitive adhesive layer of the thermosensitive adhesive label.

2. Discussion of Background

Recently, a recording label, in particular, a thermosensitive recording label has been used in a wide variety of fields, for example, in the system of point of sales (POS). The above-mentioned conventional thermosensitive recording label generally comprises a pressure-sensitive adhesive layer, and a liner (i.e., disposable backing sheet) which is attached to the adhesive layer.

Such a thermosensitive recording label is useful, but it has many shortcomings. For instance, a large space is required during the storage of the recording label because the liner thereof is relatively voluminous. Further, the step of releasing the liner from the pressure-sensitive adhesive layer is necessary when the thermosensitive recording label is used, and the liner must be discarded after released from the adhesive layer. Therefore, consideration must be given to the problem of waste disposal from the ecological viewpoint. In addition, the productivity and workability of the above-mentioned conventional thermosensitive adhesive label are poor, and the manufacturing cost is increased because of not only the cost of the linear itself, but also expenses involved by the treatment of the liner.

To solve the above-mentioned problems, there are proposed recording labels without a liner. For instance, as disclosed in Japanese Laid-Open Utility Model Applications 59-43979 and 59-46265 and Japanese Laid-Open Patent Application 60-54842, it is proposed to employ a pressure-sensitive adhesive in micro-capsule form in the adhesive layer, and to provide a releasing agent layer on a support, opposite to the side of a pressure-sensitive adhesive layer with respect to the support, in light of the storage. By the above-mentioned conventional proposals, however, the pressure-sensitive adhesive layer cannot be provided with sufficient adhesion, and it is impossible to print an image on the surface of the label, so that those proposals have not yet been put to practical use.

Furthermore, there is proposed a method of using a thermosensitive adhesive, as disclosed in Japanese Laid-Open Patent Application 63-303387 and Japanese Utility Model Publication 5-11573. When a recording label comprises a thermosensitive adhesive layer, heat-activation treatment of the thermosensitive adhesive layer becomes necessary. With respect to the above-mentioned heat activation treatment, the following methods are conventionally proposed: the application of hot air or infrared rays to the thermosensitive adhesive layer (Japanese Utility Model Publication 5-11573), the use of an electrical heater or induction coil (Japanese Laid-Open Patent Application 5-127598), the application of microwave to the thermosensitive adhesive layer (Japanese Laid-Open Patent Application 6-8977), the application of xenon flash to the thermosensitive adhesive layer (Japanese Laid-Open Patent Application 7-121108), and the application of halogen lamp to the thermosensitive adhesive layer (Japanese Laid-Open Patent Application 7-164750). Those heat activation methods have the advantages that the thermosensitive adhesive layer can be prevented from sticking to each heating medium because the thermosensitive adhesive layer can be activated without coming in direct contact with the heating medium in any of the above-mentioned heat activation methods. On the other hand, those heat activation methods have the drawback that it is necessary to add a light-absorbing material to the thermosensitive adhesive layer of the label. Further, the conventional apparatuses for heat-activating the thermosensitive adhesive layer of the label are not satisfactory in practical use in terms of safety, workability, size and cost.

In addition, when the above-mentioned thermosensitive adhesive label further comprises a thermosensitive coloring layer, it is required to prevent the coloring phenomenon in the background of the thermosensitive coloring layer during the heat activation process of the adhesive layer, so that it is extremely difficult to put this kind of thermosensitive adhesive label to practical use.

There is also proposed a heat activation method of the thermosensitive adhesive layer by bringing the thermosensitive adhesive layer into contact with a heating medium. For example, a heat-application drum and a heat-application roll serving as the above-mentioned heating media are respectively disclosed in Japanese Laid-Open Patent Applications 60-45132 and 6-263128. According to the above proposals, the surface portion of the above-mentioned heating media comprises Teflon.

In the case where the obtained adhesion of the thermosensitive adhesive layer is not strong, the thermosensitive adhesive layer can be prevented from transferring to the surface portion of the heating medium because a material with high releasability, such as Teflon, is used for the surface portion of the heating medium. However, when a thermosensitive adhesive layer is completely or continuously heat-activated so as to impart strong adhesion to the thermosensitive adhesive layer by the above-mentioned conventional heat activation methods, the heat-activated adhesive will transfer to the contact surface portion of the heating medium.

At present, there is no liner-less thermosensitive adhesive label that can match the conventional thermosensitive adhesive label equipped with a liner in the obtained adhesion of the thermosensitive adhesive layer and matching properties with the heat-activating apparatus.

SUMMARY OF THE INVENTION

It is therefore a first object of the present invention to provide a heat activation method of a thermosensitive adhesive label comprising a support and a thermosensitive adhesive layer which is formed on the support and is not adhesive at room temperature, so as to sufficiently make the thermosensitive adhesive layer adhesive with the application of heat thereto, free from the problems of safety, workability, simplicity and cost, and in addition, free from the problem of the heat-activated thermosensitive adhesive transferring to the surface of a heating medium which is brought into contact with the thermosensitive adhesive layer in the course of heat activation.

A second object of the present invention is to provide an apparatus for heat-activating the above-mentioned thermosensitive adhesive label, free from the problems of safety, workability, simplicity and cost, and in addition, free from the problem of the heat-activated thermosensitive adhesive transferring to the surface of a heating medium which is brought into contact with the thermosensitive adhesive layer in the course of heat activation.

The first object of the present invention can be achieved by a heat activation method for activating a thermosensitive adhesive label comprising a support and a thermosensitive adhesive layer which is formed on the support and is not adhesive at room temperature, so as to make the thermosensitive adhesive layer adhesive with the application of heat thereto, comprising the step of bringing the thermosensitive adhesive layer into contact with a surface portion of a heating medium for the heat activation of the thermosensitive adhesive layer, at least the surface portion of the heating medium consisting essentially of a silicone resin and having a peel strength of 2 g/mm or less with respect to the thermosensitive adhesive layer, which is measured by applying the thermosensitive adhesive layer to the surface portion of the heating medium, heating the thermosensitive adhesive layer to 90° C. for one minute under the application of a load of 2 kg thereto, and measuring the force required to peel the thermosensitive adhesive layer from the surface portion of the heating medium under T-peel condition at room temperature at a peeling speed of 300 mm/minute.

The second object of the present invention can be achieved by an apparatus for heat-activating a thermosensitive adhesive label comprising a support and a thermosensitive adhesive layer formed on the support and is not adhesive at room temperature, so as to make the thermosensitive adhesive layer adhesive with the application of heat thereto, comprising transporting means for transporting the thermosensitive adhesive label; and heating means comprising a heating medium, for heating the thermosensitive adhesive layer of the thermosensitive adhesive label by bringing the thermosensitive adhesive layer into contact with a surface portion of the heating medium, at least the surface portion of the heating medium consisting essentially of a silicone resin and having a peel strength of 2 g/mm or less with respect to the thermosensitive adhesive layer, which is measured by applying the thermosensitive adhesive layer to the surface portion of the heating medium, heating the thermosensitive adhesive layer to 90° C. for one minute under the application of a load of 2 kg thereto, and measuring the force required to peel the thermosensitive adhesive layer from the surface portion of the heating medium under T-peel condition at room temperature at a peeling speed of 300 mm/minute.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
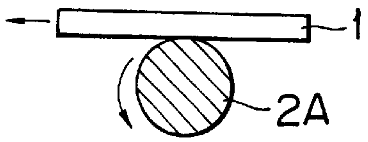
FIG. 1 is a schematic cross-sectional view which shows one example of a heating medium for use in the heat-activating apparatus of the present invention.

The thermosensitive adhesive layer of a thermosensitive adhesive label is conventionally heat-activated using a medium capable of applying heat or light to the adhesive layer in such a fashion that the thermosensitive adhesive layer is not in contact with the above-mentioned medium, as previously mentioned. When the thermosensitive adhesive layer is heat-activated by bringing the thermosensitive adhesive layer into contact with a heating medium, there is the problem of the heat-activated thermosensitive adhesive transferring to the surface of the heating medium. Therefore, the conventional heat activation method of the thermosensitive adhesive layer by bringing it into contact with the heating medium has not been considered to be useful in practical use. According to the present invention, however, it is found that when a heating medium comprises a silicone-resin-coated surface portion and such a surface portion of the heating medium can show a peel strength of 2 g/mm or less, preferably 1 g/mm or less, with respect to the thermosensitive adhesive layer of a thermosensitive adhesive label after heat activation, the thermosensitive adhesive layer can be satisfactorily heat-activated without transferring to the surface portion of the heating medium even though the adhesion of the employed thermosensitive adhesive layer is 200 g/25 mm or more.

The above-mentioned adhesion of the thermosensitive adhesive layer is measured by applying the thermosensitive adhesive layer to a plate made of SUS-304, heating the thermosensitive adhesive layer to 90° C. for one minute under the application of a load of 2 kg thereto, and measuring a tensile strength of the thermosensitive adhesive layer when the thermosensitive adhesive layer is peeled from the SUS-304 plate at a peeling speed of 300 mm/min at a peeling angle of 180°.

The above-mentioned peel strength of the silicone-resin-coated surface portion of the heating medium means a tensile strength with respect to the thermosensitive adhesive layer, which is measured by applying the thermosensitive adhesive layer to the surface portion of the heating medium, heating the thermosensitive adhesive layer to 90° C. for one minute under the application of a load of 2 kg thereto, and measuring the force required to peel the thermosensitive adhesive layer from the surface portion of the heating medium under T-peel condition at room temperature at a peeling speed of 300 mm/minute.

With the above specified peel strength of the surface portion of the heating medium with respect to the thermosensitive adhesive layer being taken into consideration, the surface portion of the heating medium comprises a silicone resin including a silicone rubber. Further, to control the above-mentioned peel strength of the silicone-resin-coated surface portion of the heating medium, a contact area of the heating medium with the thermosensitive adhesive layer may be decreased by making the surface portion of the heating medium rough, for example, by sandblasted finish or plasma coating.

In the heat activation method of the present invention, it is preferable that the surface temperature of the heating medium be controlled to 60° C. or more in the course of the heat activation for the thermosensitive adhesive label. If the surface temperature of the heating medium is lower than 60° C., a thermosensitive adhesive layer with a heat activation temperature lower than the above-mentioned surface temperature of the heating medium must be employed. In this case, the preservation stability of the thermosensitive adhesive label is poor in a non-heat-activated state.

As a heat source for the heating medium, there can be employed any heat source that is capable of heating the thermosensitive adhesive layer by the application of electrical energy, stream energy or the like, for example, halogen lamp, ceramic heater, and nichrome wire.

Figure 2:
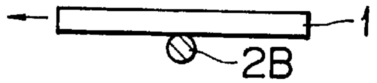
FIG. 2 is a schematic cross-sectional view which shows another example of a heating medium for use in the heat-activating apparatus of the present invention.
Figure 3:
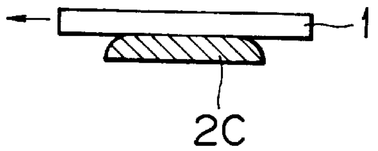
FIG. 3 is a schematic cross-sectional view which shows a further example of a heating medium for use in the heat-activating apparatus of the present invention.

The form of the heating medium for use in the present invention is not particularly limited. For instance, as shown in FIGS. 1 to 3, the heating medium in the form of a roll 2A (FIG. 1), a bar 2B (FIG. 2) or a plate 2C (FIG. 3) is available. In particular, the heating medium in the form of a roll 2A is most preferable from the viewpoint of heat-activating speed of the thermosensitive adhesive layer. In those figures, reference numeral 1 indicates a thermosensitive adhesive label.

Figure 4:
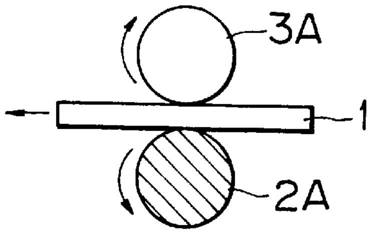
FIGS. 4 to 6 are schematic cross-sectional views, each of which shows the relationship between the heating medium and a pressure-application member for use in the heat-activating apparatus of the present invention.
Figure 5:
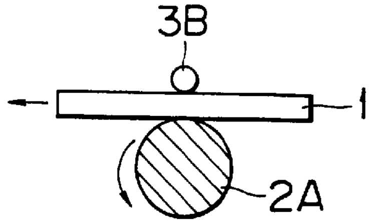
Figure 6:
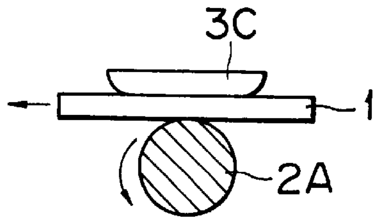

As shown in FIGS. 4 to 6, when a pressure-application member 3, to be more specific, a pressure-application roll 3A (FIG. 4), pressure-application bar 3B (FIG. 5) or pressure-application plate 3C (FIG. 6) is disposed opposite to the above-mentioned heating medium 2A via the thermosensitive adhesive label 1 so that the thermosensitive adhesive label 1 may be urged to the heating medium 2A, the thermosensitive adhesive layer of the thermosensitive adhesive label 1 can be stably heat-activated. In this case, the rotatable pressure-application roll 3A as shown in FIG. 4 is most preferable as the pressure-application member 3.

The pressure-application member can be considered to function as the heating medium in such a sense that the pressure-application member is heated by thermal conduction from the heating medium.

It is preferable that a surface portion of the above-mentioned pressure-application member 3 comprise an elastic material with a spring type hardness of 50° or less, more preferably 40° or less, when measured using a spring type hardness tester type A in accordance with the Japanese Industrial Standard JIS K6301. Alternatively, it is preferable that a surface portion of the above-mentioned pressure-application member 3 comprise an elastic material with a spring type hardness of 90° or less, more preferably 80° or less when measured using a spring type hardness tester type C in accordance with the Japanese Industrial Standard JIS K6301. The kind of spring type hardness tester, type A or type C may be determined depending on the kind of elastic material.

When the spring type hardness of the surface portion of the pressure-application member 3 is within the above specified range, a sufficient contact length of the heating medium 2 with the thermosensitive adhesive label 1 can be ensured, so that the thermosensitive adhesive layer can be uniformly heat-activated.

Figure 7A:
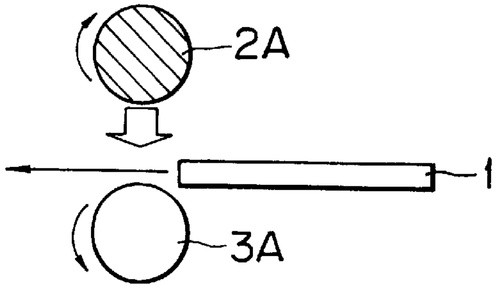
FIGS. 7(*a*) and (*b*) to 9(*a*) and (*b*) are schematic cross-sectional views, each of which explains the position of a heating medium and a pressure-application member while a thermosensitive adhesive label is subjected to heat activation and while it is not subjected to heat activation.
Figure 7B:
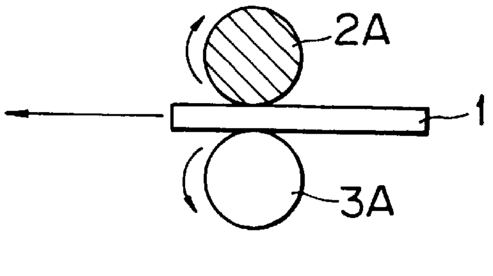
Figure 8A:
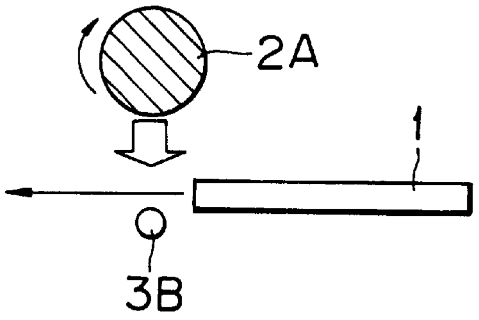
Figure 8B:
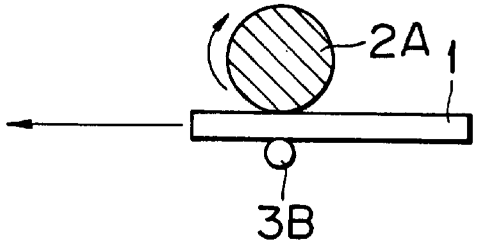
Figure 9A:
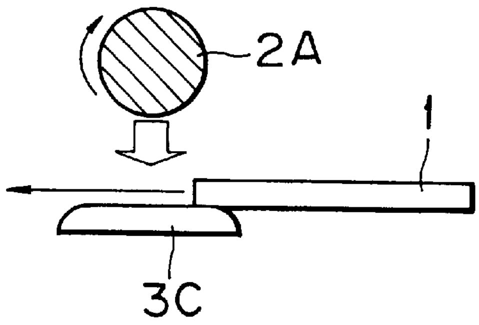
Figure 9B:
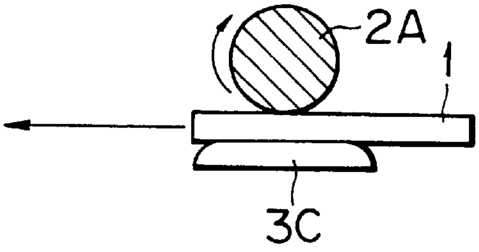

Further, in light of safety of the heat activation process, it is preferable that the pressure-application member 3A, 3B or 3C be detachable from the heating medium 2A while the thermosensitive adhesive label 1 is not subjected to heat activation, as shown in FIGS. 7(*a*), 8(*a*) and 9(*a*), and the pressure-application member 3A, 3B or 3C be attachable to the heating medium 2A via the thermosensitive adhesive label 1 in the course of heat activation, as shown in FIGS. 7(*b*), 8(*b*) and 9(*b*). To achieve the above-mentioned mode, clutch mechanism or air cylinder mechanism may be adopted.

Figure 10:
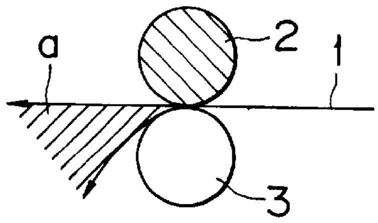
FIG. 10 is a schematic cross-sectional view, in explanation of a preferable transporting direction of a thermosensitive adhesive label when discharged from the gap between a heating medium and a pressure-application member after completion of heat activation of the thermosensitive adhesive layer.

In addition, the heat-activating apparatus of the present invention may further comprise discharging means for discharging the thermosensitive adhesive label from the heating means in the direction away from both the heating medium and the pressure-application member, with the distance of the thermosensitive adhesive label from the heating medium and the distance thereof from the pressure-application member being maintained at the same or with the distance thereof from the heating medium being maintained longer than the distance thereof from the pressure-application member. Thus, the thermosensitive adhesive label 1 can be discharged from the heating means smoothly. To be more specific, as shown in FIG. 10, it is preferable that the thermosensitive adhesive label 1 be discharged from a gap between a heating medium 2 and a pressure-application member 3 in a direction of arrow within a shaded range "a". To meet the above-mentioned discharging condition of the thermosensitive adhesive label 1, for example, the hardness of the heating medium 2 may be substantially the same as, or lower than that of the pressure-application member 3.

Furthermore, according to the present invention, the heat activation method may further comprise a step of applying a silicone oil to the surface portion of the heating medium so as to retain the silicone oil in an amount of 0.10 $g/m^2$ or less on the surface portion of the heating medium in the course of heat activation of the thermosensitive adhesive layer. When the thermosensitive adhesive layer is heat-activated by bringing it into contact with a surface portion of the heating medium which is coated with a small amount of silicone oil, heat activation of the thermosensitive adhesive layer can be satisfactorily carried out without the transfer of the heat-activated thermosensitive adhesive layer to the surface portion of the heating medium. When the amount of silicone oil retained on the surface portion of the heating medium is 0.10 $g/m^2$ or less, decrease of the adhesion of the heat-activated thermosensitive adhesive layer can be prevented.

In this case, any silicone oil that can prevent the heat-activated thermosensitive adhesive layer from transferring to the surface portion of the heating medium may be usable. In particular, a silicone oil comprising dimethyl polysiloxane is preferably employed.

Figure 11:
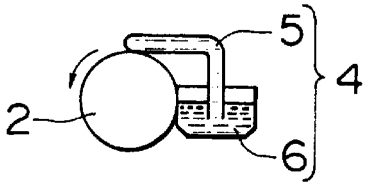
FIG. 11 is a schematic cross-sectional view which shows one example of silicone-oil-application means for supplying a slight amount of silicone oil to the surface portion of a heating medium for use in the heat-activating apparatus of the present invention.
Figure 12:
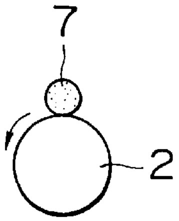
FIG. 12 is a schematic cross-sectional view which shows another example of silicone-oil-application means for supplying a slight amount of silicone oil to the surface portion of a heating medium for use in the heat-activating apparatus of the present invention.
Figure 13:
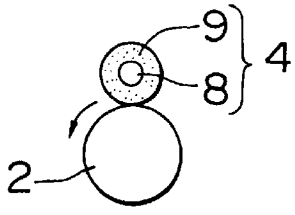
FIG. 13 is a schematic cross-sectional view which shows a further example of silicone-oil-application means for supplying a slight amount of silicone oil to the surface portion of a heating medium for use in the heat-activating apparatus of the present invention.

Such silicone-oil-application means for use in the heat-activating apparatus of the present invention is illustrated as in FIGS. 11 to 13.

For instance, as shown in FIG. 11, a silicone-oil-application device 4 comprises a silicone-oil tank 6 and a silicone-oil supplying member 5 made of felt. The silicone oil absorbed by the silicone-oil supplying felt 5 is uniformly supplied to the surface portion of the rotating heating medium 2.

In FIG. 12, a felt roll impregnated with a silicone oil 7 is brought into contact with the heating medium 2, so that a slight amount of silicone oil can be supplied to the surface portion of the heating medium 2.

In FIG. 13, a silicone-oil-application device 4 comprises a silicone oil 8 and a porous roll 9 having the silicone oil 8 therein.

According to the present invention, the thermosensitive adhesive label may further comprise a thermosensitive coloring layer comprising a color developer and a coloring agent such as a leuco dye, which is formed on the support, opposite to the side of the above-mentioned thermosensitive adhesive layer with respect to the support.

In such a case, it is desirable that a coloring initiation temperature of the thermosensitive coloring layer be higher than a heat activation temperature of the thermosensitive adhesive layer by 10° C. or more. The above-mentioned coloring initiation temperature of the thermosensitive coloring layer is a temperature where a coloring density of the thermosensitive coloring layer, measured by a McBeth densitometer RD-914, reaches 0.2 when the heat gradient test is carried out under the application of a load of 2 $kg/cm^2$ for one second using a commercially available heat gradient tester (made of Toyo Seiki Seisaku-sho, Ltd.). On the other hand, the heat activation temperature of the thermosensitive adhesive layer is a temperature where the adhesion of the adhesive layer is first exhibited under the same heat gradient condition as mentioned above.

In the thermosensitive adhesive label for use in the present invention, it is preferable that an insulating layer be provided between the support and the thermosensitive coloring layer and/or between the support and the thermosensitive adhesive layer. By provision of the insulating layer, it is possible to make great difference between the heat activation temperature of the thermosensitive adhesive layer and the coloring initiation temperature of the thermosensitive coloring layer. This is because the dynamic thermal energy for the coloring of the thermosensitive coloring layer generated by, for example, a thermal head can be efficiently utilized in the thermosensitive coloring layer to improve the coloring sensitivity of the thermosensitive coloring layer by the provision of the insulating layer between the support and the thermosensitive coloring layer. As a result, the coloring initiation temperature can be increased. On the other hand, due to the insulating layer between the support and the thermosensitive adhesive layer, the heat-activation efficiency of the thermosensitive adhesive layer can be increased, so that the heat activation temperature can be decreased.

In the present invention, there can be employed a non-expandable insulating layer comprising minute void particles with a voidage of 30% or more, each comprising a thermoplastic resin for forming a shell, or comprising a porous pigment; and an expandable insulating layer comprising an expandable filler.

The minute void particles with a voidage of 30% or more for use in the insulating layer are minute particles in an expanded state containing air or other gases therein. The minute void particles with an average particle size of 2.0 to 20 $\mu m$, preferably 3 to 10 $\mu m$ are employed. When the average particle diameter (outer diameter) of the minute void particles is 2.0 $\mu m$ or more, void particles with a desired voidage can be produced with no difficulty; and when the average particle diameter (outer diameter) of the minute void particles is 20 $\mu m$ or less, the surface smoothness of the obtained insulating layer is not so lowered that the decrease of the adhesion between the thermosensitive coloring layer and the thermal head can be prevented. Accordingly, the decrease of dot-reproduction performance and thermosensitivity can be avoided. It is also preferable that the above-mentioned minute particles be classified in a uniform particle size spectrum.

The voidage of the minute void particles for use in the insulating layer is preferably 30% or more, more preferably 50% or more. When the insulating layer interposed between the support and the thermosensitive coloring layer has a voidage of 30% or more, sufficient insulating properties can be obtained, so that the thermal energy for the coloring of the thermosensitive coloring layer, which is generated, for example, by a thermal head, can be efficiently utilized in the thermosensitive coloring layer without escaping through the support, thereby improving the thermal sensitivity. In addition, due to the insulating layer between the support and the thermosensitive adhesive layer, the thermal energy applied to the thermosensitive adhesive layer by the heating medium for heat activation can be efficiently used for heat activation of the thermosensitive adhesive layer, so that sufficient adhesion can be exhibited.

The voidage of minute void particles means a ratio of the outer diameter to the inner diameter of void particles, which is expressed by the following formula:

$$\text{Voidage (\%)} = \frac{\text{(inner diameter of void particles)}}{\text{(outer diameter of void particles)}} \times 100$$

The minute void particles comprise a thermoplastic resin for forming a shell thereof, as previously mentioned. As the above-mentioned thermoplastic resin, a copolymer resin comprising as the main components vinylidene chloride and acrylonitrile is preferably employed.

Examples of the porous pigment for use in the non-expandable insulating layer include an organic pigment such as urea-formaldehyde resin, and an inorganic pigment such as shirasu clay.

To provide the non-expandable insulating layer on the support, the above-mentioned minute void particles or porous pigment may be dispersed in water together with a binder agent such as a conventionally known water-soluble polymer or an aqueous polymer emulsion to prepare a coating liquid for the formation of the insulating layer. The coating liquid thus prepared may be coated on the support and dried, so that an insulating layer is provided on the support. In such a case, it is preferable that the deposition amount of the minute void particles be at least 1 $g/m^2$, more preferably in the range of about 2 to 15 $g/m^2$. The binder agent for use in the coating liquid for the non-expandable insulating layer may be in such an amount that can stably bind the insulating layer to the support, and in general, the amount of the binder agent may be in the range of 2 to 50 wt. % of the total weight of the minute void particles and the binder agent.

Examples of the water-soluble polymer serving as the binder agent for the preparation of a non-expandable insulating layer coating liquid are polyvinyl alcohol, starch and starch derivatives, cellulose derivates such as methoxy cellulose, hydroxyethyl cellulose, carboxymethyl cellulose, methyl cellulose and ethyl cellulose, sodium polyacrylate, polvyinyl pyrrolidone, acrylamide—acrylic ester copolymer, acrylamide—acrylic ester—methacrylic acid terpolymer, alkali salts of styrene—maleic anhydride copolymer, polyacrylamide, sodium alginate, gelatin and casein.

Examples of the aqueous polymer emulsion serving as the binder agent for the preparation of a non-expandable insulating layer coating liquid are latexes such as styrene—butadiene copolymer and styrene—butadiene—acrylic copolymer; and emulsions such as vinyl acetate resin, vinyl acetate—acrylic acid copolymer, styrene—acrylic ester copolymer, acrylic ester resin, and polyurethane resin.

When the expandable filler is used for formation of the expandable insulating layer, there can be employed plastic void filler particles, each comprising a thermoplastic resin for forming a shell thereof and a blowing agent such as a low boiling point solvent therein. Those void plastic filler particles are expanded by the application of heat thereto. Such an expandable plastic filler is conventionally known. It is preferable that the particle size of expandable plastic filler be in the range of 2 to 50 $\mu$m, more preferably 5 to 20 $\mu$m in a non-expanded state, and in the range of 10 to 100 $\mu$m, more preferably 10 to 50 $\mu$m in an expanded state.

Examples of the thermoplastic resin for forming the shell of the expandable plastic filler particles are polystyrene, polyvinyl chloride, polyvinylidene chloride, polyvinyl acetate, polyacrylate, polyacrylonitrile, polybutadiene and copolymers comprising monomers constituting the above-mentioned resin. As the blowing agent, propane or butane is generally employed.

When such an expandable insulating layer is provided on the support, a mixture of the above-mentioned expandable plastic filler and a binder agent is coated on the support and dried, and thereafter the plastic filler may be caused to blow with the application of heat thereto by bringing a heated plate into contact with the surface of the coated layer.

It is preferable that the deposition amount of the plastic filler be at least 1 $g/m^2$, more preferable about 2 to 5 $g/m^2$ in a non-expanded state. The binder agent may be added to the plastic filler in such an amount that can firmly bind the obtained expandable insulating layer to the support. In general, the amount of the binder agent is in the range of 5 to 50 wt. % of the total weight of the non-expanded plastic filler and the binder agent. The blowing temperature of the plastic filler is a softening point of the thermoplastic resin constituting the shell of the plastic filler particles. It is preferable that the blowing magnification be 2 to 4 times, more preferably 2 to 3 times.

The surface of the obtained insulating layer of an expanded type is considerably rough, so that it is preferable to subject the insulating layer to surface treatment by calendering after expanding the plastic filler particles by the application of heat thereto. When necessary, at least one undercoat layer may be provided on the insulating layer. Such an undercoat may also be provided under the obtained insulating layer.

The above-mentioned insulating layer may further comprise auxiliary additives which are conventionally used in this kind of thermosensitive recording material, for example, a thermofusible material and a surfactant. The same thermofusible materials for use in the thermosensitive coloring layer, which will be described in detail, are usable in the insulating layer.

The thermosensitive adhesive layer will now be explained in detail.

The formulation for the thermosensitive adhesive layer comprises:

(a) a polymeric resin, (b) a plasticizer which assumes a solid form at room temperature, and (c) a tackiness-imparting agent.

Examples of the polymeric resin (a) are as follows: polyvinyl acetate, polybutyl methacrylate, vinyl acetate—vinylidene chloride copolymer, synthetic rubber, vinyl acetate—2-ethylhexyl acrylate copolymer, vinyl acetate—ethylene copolymer, vinyl pyrrolidone—styrene copolymer, styrene—butadiene copolymer, and vinyl pyrrolidone—ethyl acrylate copolymer.

Examples of the plasticizer (b) are as follows: diphenyl phthalate, dihexyl phthalate, dicyclohexyl phthalate, dihydroabietyl phthalate, dimethyl isophthalate, sucrose benzoate, ethylene glycol dibenzoate, trimethylolethane tribenzoate, glyceride tetrabenzoate, pentaerythritol tetrabenzoate, sucrose octacetate, tricyclohexyl citrate, and N-cyclohexyl-p-toluenesulfonamide.

Examples of the tackiness-imparting agent (c) are as follows: rosin and derivatives thereof such as polymerized rosin, hydrogenated rosin, esters of the above-mentioned rosin and glycerin or pentaerythritol, and dimers of resin acid; terpene resin; petroleum resin; phenolic resin; and xylene resin.

Example of the formulation for the thermosensitive adhesive layer for use in the present invention is shown below:

| | Parts by Weight |
|---|---|
| Styrene-butadiene copolymer | 30–70 |
| Dicyclohexyl phthalate | 2–15 |
| Pentaerythritol tetrabenzoate | 20–60 |

In order to improve the heat activation properties of the thermosensitive adhesive layer, the thermosensitive adhesive layer or the insulating layer interposed between the support and the thermosensitive adhesive layer may further comprise a material capable of efficiently absorbing thermal energy, such as graphite.

In the thermosensitive adhesive label for use in the present invention, the thermosensitive coloring layer may be provided on the support, opposite to the side of the thermosensitive adhesive layer with respect to the support. The thermosensitive coloring layer will be now explained in detail.

The thermosensitive coloring layer comprises a coloring composition which can induce color formation by the application of heat thereto. For instance, the above-mentioned coloring composition comprises a coloring agent such as a leuco dye and a color developer.

As the leuco dye for use in the present invention, which may be employed alone or in combination, any conventional dyes for use in the conventional leuco-dye-containing recording materials can be employed. For example, triphenylmethane leuco compounds, fluoran leuco compounds, phenothiazine leuco compounds, auramine leuco compounds, spiropyran leuco compounds, indolinophthalide leuco compounds are preferably employed. Specific examples of those leuco dyes are as follows:

3,3-bis(p-dimethylaminophenyl)phthalide,
3,3-bis(p-dimethylaminophenyl)-6-dimethylaminophthalide (or Crystal Violet Lactone),
3,3-bis(p-dimethylaminophenyl)-6-diethylamino-phthalide,
3,3-bis(p-dimethylaminophenyl)-6-chlorophthalide,
3,3-bis(p-dibutylaminophenyl)phthalide,
3-cyclohexylamino-6-chlorofluoran,
3-dimethylamino-5,7-dimethylfluoran,
3-diethylamino-7-chlorofluoran,
3-diethylamino-7-methylfluoran,
3-diethylamino-7,8-benzfluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-[N-(3'-trifluoromethylphenyl) amino]-6-diethylaminofluoran,
2-[3,6-bis(diethylamino)-9-(o-chloroanilino) xanthylbenzoic acid lactam],
3-diethylamino-6-methyl-7-(m-trichloromethyl-anilino) fluoran,
3-diethylamino-7-(o-chloroanilino)fluoran,
3-di-n-butylamino-7-(o-chloroanilino)fluoran,
3-N-methyl-N, n-amylamino-6-methyl-7-anilinofluoran,
3-N-methyl-N-cyclohexylamino-6-methyl-7-anilinofluoran,
3-diethylamino-6-methyl-7-anilinofluoran,
3-(N, N-diethylamino)-5-methyl-7-(N,N-dibenzyl-amino) fluoran,
benzoyl leuco methylene blue,
6'-chloro-8'-methoxy-benzoindolino-spiropyran,
6'-bromo-3'-methoxy-benzoindolino-spiropyran,
3-(2'-hydroxy-4'-dimethylaminophenyl)-3-(2'-methoxy-5'-chlorophenyl)phthalide,
3-(2'-hydroxy-4'-dimethylaminophenyl)-3-(2'-methoxy-5'-nitrophenyl)phthalide,
3-(2'-hydroxy-4'-diethylaminophenyl)-3-(2'-methoxy-5'-methylphenyl)phthalide,
3-(2'-methoxy-4'-dimethylaminophenyl)-3-(2'-hydroxy-4'-chloro-5'-methylphenyl)phthalide,
3-(N-ethyl-N-tetrahydrofurfuryl)amino-6-methyl-7-anilinofluoran,
3-N-ethyl-N-(2-ethoxypropyl)amino-6-methyl-7-anilinofluoran,
3-N-methyl-N-isobutyl-6-methyl-7-anilinofluoran,
3-morphorino-7-(N-propyl-trifluoromethylanilino)-fluoran,
3-pyrrolidino-7-m-trifluoromethylanilinofluoran,
3-diethylamino-5-chloro-7-(N-benzyl-trifluoromethylanilino)fluoran,
3-pyrrolidino-7-(di-p-chlorophenyl)methylamino-fluoran,
3-diethylamino-5-chloro-7-(α-phenylethylamino)-fluoran,
3-(N-ethyl-p-toluidino)-7-(α-phenylethylamino)-fluoran,
3-diethylamino-7-(o-methoxycarbonylphenylamino)-fluoran,
3-diethylamino-5-methyl-7-(α-phenylethylamino)-fluoran,
3-diethylamino-7-piperidinofluoran,
2-chloro-3-(N-methyltoluidino)-7-(p-n-butylanilino)-fluoran,
3-(N-methyl-N-isopropylamino)-6-methyl-7-anilinofluoran,
3-di-n-butylamino-6-methyl-7-anilinofluoran,
3,6-bis(dimethylamino)fluorenespiro(9,3')-6'-dimethylaminophthalide,
3-(N-benzyl-N-cyclohexylamino)-5,6-benzo-7-α-naphthylamino-4'-bromofluoran,
3-diethylamino-6-chloro-7-anilinofluoran,
3-diethylamino-6-methyl-7-mesidino-4',5'-benzofluoran,
3-N-methyl-N-isopropyl-6-methyl-7-anilinofluoran,
3-N-ethyl-N-isoamyl-6-methyl-7-anilinofluoran, and
3-diethylamino-6-methyl-7-(2',4'-dimethylanilino)-fluoran.

As the color developer for use in the thermosensitive coloring layer, there can be employed a variety of electron-acceptor compounds and oxidizing agents which are capable of inducing color formation in the above-mentioned leuco dyes when coming in contact with the leuco dyes under application of heat thereto.

Specific examples of the color developer for use in the present invention are as follows:

4,4'-isopropylidenediphenol,
4,4'-isopropylidenebis-(o-methylphenol),
4,4'-sec-butylidenebisphenol,
4,4'-isopropylidenebis(2-tert-butylphenol),
zinc p-nitrobenzoate,
1,3,5-tris(4-tert-butyl-3-hydroxy-2,6-dimethyl-benzyl) isocyanuric acid,
2,2-(3,4'-dihydroxyphenyl)propane,
bis(4-hydroxy-3-methylphenyl)sulfide,
4-[β-(p-methoxyphenoxy)ethoxy]salicylic acid,
1,7-bis(4-hydroxyphenylthio)-3,5-dioxaheptane,
1,5-bis(4-hydroxyphenylthio)-5-oxapentane, monocalcium salt of monobenzyl phthalate,
4,4'-cyclohexylidenediphenol,
4,4'-isopropylidenebis(2-chlorophenol),
2,2'-methylenebis(4-methyl-6-tert-butylphenol),
4,4'-butylidenebis(6-tert-butyl-2-methyl)phenol,
1,1,3-tris(2-methyl-4-hydroxy-5-tert-butylphenyl)butane,
1,1,3-tris(2-methyl-4-hydroxy-5-cyclohexylphenyl)-butane,
4,4'-thiobis(6-tert-butyl-2-methylphenol),
4,4'-diphenolsulfone,
4-isopropoxy-4'-hydroxydiphenylsulfone,
4-benzyloxy-4'-hydroxydiphenylsulfone,
4,4'-diphenolsulfoxide,
isopropyl p-hydroxybenzoate,
benzyl p-hydroxybenzoate, benzyl protocatechuate,
stearyl gallate,
lauryl gallate,
octyl gallate,
1,3-bis(4-hydroxyphenylthio)propane,
N,N'-diphenylthiourea,
N,N'-di(m-chlorophenyl)thiourea,
salicylanilide,
bis(4-hydroxyphenyl)methyl acetate,
bis(4-hydroxyphenyl)benzyl acetate,
1,3-bis(4-hydroxycumyl)benzene,
1,4-bis(4-hydroxycumyl)benzene,
2,4'-diphenolsulfone,
2,2'-diallyl-4,4'-diphenolsulfone,
3,4-dihydroxyphenyl-4'-methyldiphenylsulfone,
zinc 1-acetyloxy-2-naphthoate,
zinc 2-acetyloxy-1-naphthoate,
zinc 2-acetyloxy-3-naphthoate,
α,α-bis(4-hydroxyphenyl)-α-methyltoluene,
antipyrine complex of zinc thiocyanate,
tetrabromobisphenol A,
tetrabromobisphenol S,
4,4'-thiobis(2-methylphenol), and
4,4'-thiobis(2-chlorophenol).

The above-mentioned color developers may be used alone or in combination.

In the thermosensitive coloring layer, it is preferable that the amount of the color developer be one to 20 parts by weight, more preferably 2 to 10 parts by weight, to one part by weight of the coloring agent.

The thermosensitive coloring layer may further comprise a binder resin. Particularly, binder resins having a hydroxyl group or carboxyl group in a molecule thereof are preferably employed.

Specific examples of such a binder agent for use in the thermosensitive coloring layer are polyvinyl butyral, polyvinyl acetal including polyvinyl acetoacetal, cellulose derivatives such as ethyl cellulose, cellulose acetate, cellulose acetate propionate and cellulose acetate butyrate, and epoxy resin. Those binder resins can be used alone or in combination.

The thermosensitive coloring layer may further comprise auxiliary additive components such as a filler, a surfactant, a lubricant and an agent for preventing color formation by pressure application, which are used in the conventional thermosensitive recording materials, so long as the coloring characteristics of the thermosensitive coloring layer are not impaired.

Examples of the filler for use in the thermosensitive coloring layer are finely-divided particles of inorganic fillers such as calcium carbonate, silica, zinc oxide, titanium oxide, aluminum hydroxide, zinc hydroxide, barium sulfate, clay, kaolin, talc, and surface-treated calcium and silica; and finely-divided particles of organic fillers such as urea-formaldehyde resin, styrene—methacrylic acid copolymer, polystyrene resin and vinylidene chloride resin.

Examples of the lubricant for use in the thermosensitive coloring layer are higher fatty acids and metallic salts thereof, higher fatty amides, higher fatty acid esters, and a variety of waxes such as an animal wax, a vegetable wax, a mineral wax and a petroleum wax.

Thermosensitive adhesive label for use in the present invention may further comprise a protective layer which is provided on the thermosensitive coloring layer. The protective layer for use in the present invention is considered to be important in order to improve the chemical resistance, water resistance, wear resistance, light resistance and head-matching properties of the obtained label.

The protective layer for use in the present invention may be a film comprising as the main component a water-soluble resin or hydrophobic resin, or a film comprising as the main component an ultraviolet-curing resin or electron-beam curing resin.

Examples of the water-soluble resin for use in the protective layer are polyvinyl alcohol, modified polyvinyl alcohol, cellulose derivatives such as methyl cellulose, methoxy cellulose and hydroxy cellulose, casein, gelatin, polyvinyl pyrrolidone, styrene—maleic anhydride copolymer, dilsobutylene—maleic anhydride copolymer, polyacrylamide, modified polyacrylamide, methyl vinyl ether—maleic anhydride copolymer, carboxyl-modified polyethylene, polyvinyl alcohol—acrylamide block copolymer, melamine—formaldehyde resin, and urea—formaldehyde resin.

Examples of the resin for an aqueous emulsion and the hydrophobic resin for use in the protective layer include polyvinyl acetate, polyurethane, styrene—butadiene copolymer, styrene—butadiene—acrylic copolymer, polyacrylic acid, polyacrylate, vinyl chloride—vinyl acetate copolymer, polybutyl methacrylate, polyvinyl butyral, polyvinyl acetal, ethyl cellulose, and ethylene—vinyl acetate copolymer. Further, a copolymer comprising a monomer constituting the above-mentioned resin and a silicone segment may also be preferably employed. When necessary, the resin may be cured using a curing agent.

The ultraviolet-curing resin for use in the protective layer is prepared by polymerizing a monomer, oligomer or prepolymer which is polymerizable to form a cured resin by the application of ultraviolet light thereto. There are no limitations on such a monomer, oligomer or prepolymer for the preparation of the ultraviolet-curing resin for use in the protective layer, but conventional monomers, oligomers, or prepolymers can be employed.

There are no particular limitations on the electron-beam curing resin for use in the protective layer. Particularly preferable examples of the electron-beam curing resin include an electron-beam curing resin comprising a polyester skeleton with a five or more functional branched molecular structure, and a resin comprising as the main component a silicone-modified electron-beam curing resin.

In order to further improve the matching properties of the obtained recording label to a thermal head, the protective layer may further comprise an inorganic and organic filler, and a lubricant so long as the surface smoothness of the protective layer is not impaired.

It is preferable that the particle size of the filler for use in the protective layer be 0.3 μm or less. Further, the oil absorption of the filler is preferably 30 ml/100 g or more, and more preferably, 80 ml/100 g or more.

The above-mentioned inorganic and organic filler for use in the protective layer, which may be used alone or in combination, can be selected from any pigments used in the conventional thermosensitive recording media.

Specific examples of the inorganic pigment for use in the protective layer are calcium carbonate, silica, zinc oxide, titanium oxide, aluminum hydroxide, zinc hydroxide, barium sulfate, clay, talc and surface-treated calcium and silica.

Specific examples of the organic pigment for use in the protective layer are urea-formaldehyde resin, styrene—methacrylic acid copolymer and polystyrene resin.

The protective layer may be provided on the thermosensitive coloring layer by any of the conventional coating methods. It is preferable that the thickness of the protective layer be in the range of 0.1 to 20 μm, more preferable in the range of 0.5 to 10 $\mu$m. When the thickness of the protective layer is within the above-mentioned range, the functions of the protective layer, that is, the improvements of preservation stability of the recording label and head-matching properties of the thermosensitive coloring layer can be sufficiently expected, and the decreases of thermal sensitivity of the thermosensitive coloring layer can be prevented.

The thermosensitive adhesive label, of which thermosensitive adhesive layer can be made adhesive by the heat activation method of the present invention, is used not only as (1) the above-mentioned thermosensitive recording adhesive label comprising the thermosensitive coloring layer, but also as (2) an image-receiving adhesive label for thermal image transfer ink ribbon, (3) an image-receiving adhesive label for ink-jet image printing, and (4) an image-receiving adhesive label for sublimation type thermal image transfer ink ribbon.

Figure 16:
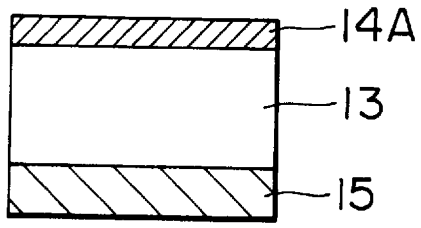
FIG. 16 is a schematic cross-sectional view of a thermosensitive adhesive recording label comprising a thermosensitive coloring layer for use in the present invention.

(1) Thermosensitive recording adhesive label:

As shown in FIG. 16, a thermosensitive recording adhesive label comprises a support 13 such as a sheet of paper and synthetic paper or a PET film; a thermosensitive coloring layer 14A formed on the front side of the support 13, comprising a coloring agent such as a leuco dye and a color developer; and a thermosensitive adhesive layer 15 formed on the back side of the support 13, opposite to the thermosensitive coloring layer 14A with respect to the support 13. When necessary, an insulating layer may be interposed between the support 13 and the thermosensitive coloring layer 14A, and a protective layer may be provided on the thermosensitive coloring layer 14A.

(2) Image-receiving adhesive label for thermal image transfer ink ribbon:

A thermal image transfer recording ink ribbon comprises a support with a thickness of several micrometers and an ink layer formed thereon, comprising a thermofusible ink (monochrome or color) with a thickness of several micrometers, capable of assuming a solid form at room temperature. According to the thermal image transfer recording method, the thermofusible ink layer is imagewise softened and melted by the application of heat thereto, for example, using a thermal head, and transferred to an image-receiving sheet, thereby obtaining images on the image-receiving sheet.

Figure 17:
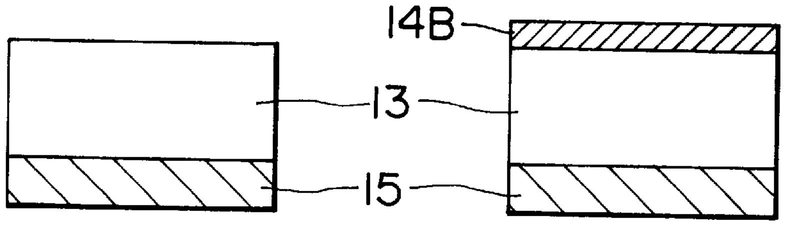
FIGS. 17(*a*) and (*b*) are a schematic cross-sectional views of an image-receiving adhesive label for thermal image transfer ink ribbon.

As shown in FIGS. 17(*a*) and (*b*), an image-receiving adhesive label for thermal image transfer ink ribbon comprises a support 13 such as a sheet of plain paper or coat paper, a thermosensitive adhesive layer 15 formed on the back side of the support 13, and a thermofusible-ink-receiving layer 14B formed on the front side of the support 13. As the thermofusible-ink-receiving layer 14B, there can be employed any layer that comprises an inorganic filler such as clay or calcium carbonate by internal addition or external coating, and that has a relatively high surface smoothness to such a degree that can receive a thermofusible ink image thereon.

(3) Image-receiving adhesive label for ink-jet image printing:

Ink-jet printing is carried out using an ink-jet printer comprising a head which is provided with numerous nozzles at high density. The nozzles are caused to eject monochromatic or color ink comprising a dyestuff onto an image-receiving material to form an ink image thereon.

Figure 18:
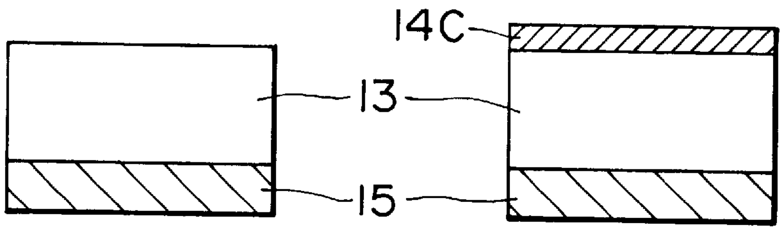
FIGS. 18(*a*) and (*b*) is a schematic cross-sectional views of an image-receiving adhesive label for ink-jet image printing.

As shown in FIGS. 18 (*a*) and (*b*), an image-receiving adhesive label for ink-jet image printing comprises a support 13 such as a sheet of plain paper or coat paper, an ink-absorbing layer 14C formed on the front side of the support 13, and a thermosensitive adhesive layer 15 formed on the back side of the support 13.

Generally, the ink for use in ink-jet printing comprises a wetting agent to prevent clogging of the nozzles, so that the ink image formed on the image-receiving material does not readily dry. Therefore, there is commonly employed as an image-receiving material for ink-jet printing a special paper such as a paper containing no sizing agent or a coat paper prepared by coating finely-divided particles of silica or water-soluble binder agent on a sheet of paper. However, the image-receiving material for ink-jet printing is not limited to the above-mentioned special paper. For instance, a sheet of plain paper, such as an acidic paper or neutral paper, and a film for use with the overhead projector (OHP) can also be employed.

(4) Image-receiving adhesive label for sublimation type thermal image transfer ink ribbon:

In accordance with the principle of sublimation type thermal image transfer recording, a thermal image transfer recording medium comprising a sublimable-dye-containing layer is imagewise heated using, for example, a thermal head to sublimate the sublimable dye and transfer it to a sublimable-dye-receiving layer of an image-receiving material.

Figure 19:
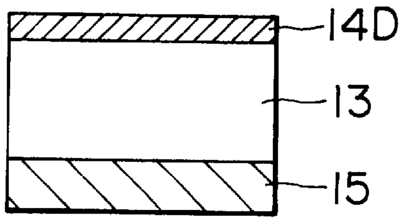
FIG. 19 is a schematic cross-sectional view of an image-receiving adhesive label for sublimation type thermal image transfer ink ribbon.

As shown in FIG. 19, an image-receiving adhesive label for sublimation type thermal image transfer ink ribbon comprises a support 13, a sublimable-dye-receiving layer 14D with high surface smoothness and high glossiness, formed on the front side of the support 13, and a thermosensitive adhesive layer 15 formed on the back side of the support 13.

The support 13 for use in the image-receiving adhesive label for sublimation type thermal image transfer ink ribbon is required to have proper heat resistance and homogeneity as a whole and high surface smoothness and flexibility at the surface portion, so that the support 13 is generally prepared by providing a flexible whitening power layer on a sheet of synthetic paper or a PET film with a thickness of 100 to 200 $\mu$m. Further, the sublimable-dye-receiving layer is required to have sufficient dyeing properties, color reproduction characteristics, fixing properties of dyestuff, and releasability from the sublimable-dye-containing layer of the thermal image transfer recording medium. In light of these requirements, the sublimable-dye-receiving layer comprises a thermoplastic polyester resin in general. In addition, to improve the preservation stability of the image formed on the image-receiving material and prevent the image-receiving material from fusing and adhering to the sublimable-dye-containing layer of the thermal image transfer recording medium, the sublimable-dye-receiving layer may comprise other resins than the thermoplastic polyester resin, inorganic particles, a metal complex and a releasing agent, or the sublimable-dye-receiving layer may be cured.

As mentioned above, for the support 13 for use in any of the above-mentioned image-receiving adhesive labels, there can be employed not only a sheet of paper, but also a polyester film made of polyethylene terephthalate or polybutylene terephthalate, a cellulose derivative film made of cellulose triacetate, a polyolefin film made of polypropylene or polyethylene, or a polystyrene film. Further, a laminated material of the above-mentioned films is usable.

Figure 14:
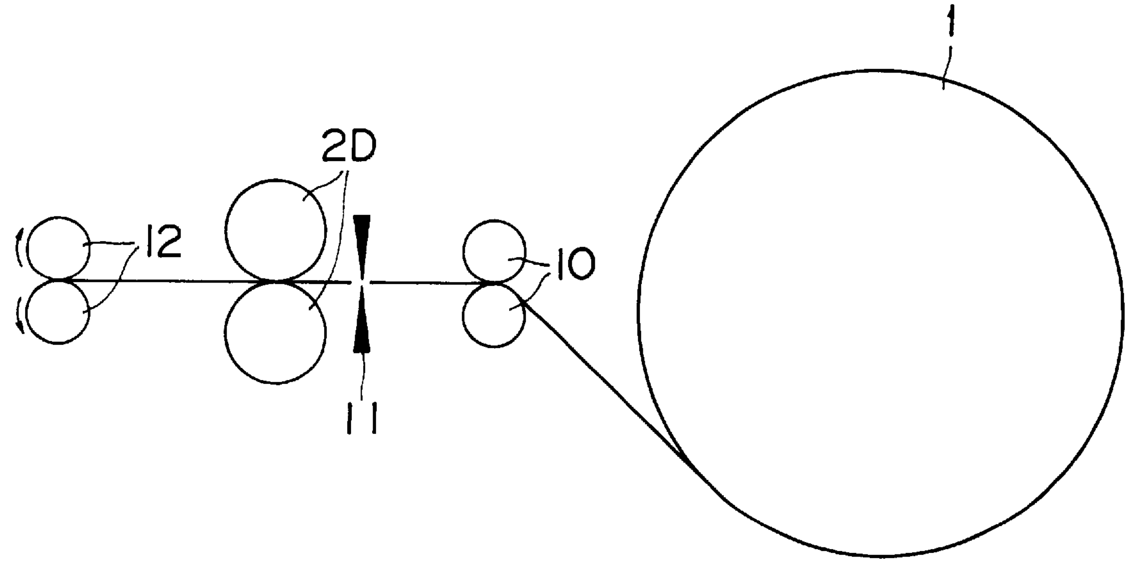
FIG. 14 is a schematic cross-sectional view which shows one example of a label printer according to the present invention, which comprises an apparatus for heat activating the thermosensitive adhesive layer of a thermosensitive adhesive label.
Figure 15:
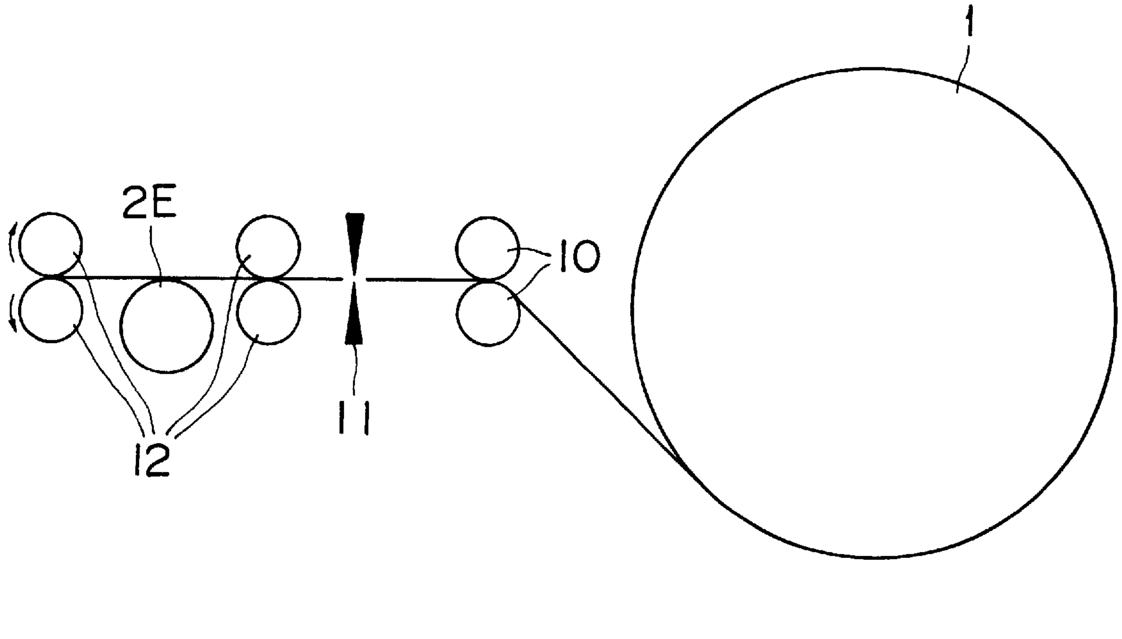
FIG. 15 is a schematic cross-sectional view which shows another example of a label printer according to the present invention, which comprises an apparatus for heat activating the thermosensitive adhesive layer of a thermosensitive adhesive label.

According to the printing method as mentioned above, for example, thermosensitive recording method, ink-jet printing method or sublimation type thermal image transfer recording method, there is provided a label printer for a thermosensitive recording adhesive label, as shown in FIGS. 14 or 15.

Namely, the label printer according to the present invention is capable of printing an image on the above-mentioned image-receiving layer of the thermosensitive adhesive label, formed on the front side of the support, and heat-activating the thermosensitive adhesive layer formed on the back side of the support, opposite to the image-receiving layer with respect to the support, with the application of heat thereto. The label printer of the present invention comprises label transporting means for transporting the thermosensitive adhesive label; printing an image on the image-receiving layer of the thermosensitive adhesive label; cutting the thermosensitive adhesive label to a predetermined length; and heat-activating means for activating the thermosensitive adhesive layer of the thermosensitive adhesive label by bringing the thermosensitive adhesive layer into contact with a surface portion of a heating medium for the heat activation of the thermosensitive adhesive layer, at least the surface portion of the heating medium consisting essentially of a silicone resin and having a peel strength of 2 g/mm or less with respect to the thermosensitive adhesive layer. In this label printer, the above-mentioned printing means, cutting means and heat-activating means may be arranged in any order.

For instance, in a label printer as shown in FIG. 14, a thermosensitive adhesive label 1 is transported by transporting means 10, an image is formed on the image-receiving layer of the thermosensitive adhesive label 1 using printing means (not shown), the thermosensitive adhesive label 1 is cut to a predetermined length using cutting means 11, and then, a thermosensitive adhesive layer of the thermosensitive adhesive label 1 is heat-activated in such a manner that the adhesive label 1 is caused to pass through heat-activating means 2D comprising a heat-application roll and a pressure-application roll, with the thermosensitive adhesive layer being brought into contact with the surface of the heat-application roll. In this case, the heat-activating means 2D can also serve as driving means for driving the thermosensitive adhesive label 1 as well as a pair of rollers 12.

In FIG. 15, heat-activating means 2E is not provided with the function of driving the thermosensitive adhesive label 1, so that rollers 12 which are disposed upstream and downstream with respect to the heat-activating means 2E along the transporting path serve to drive the thermosensitive adhesive label 1.

Other features of this invention will become apparent in the course of the following description of exemplary embodiments, which are given for illustration of the invention are not intended to be limiting thereof.

EXAMPLE 1

[Preparation of Thermosensitive Recording Adhesive Label]

(Formation of Insulating Layer)

The following components were stirred and dispersed, so that a coating liquid for a non-expandable insulating layer was prepared:

| | Parts by Weight |
|---|---|
| Aqueous dispersion of minute void particles (copolymer resin comprising vinylidene chloride and acrylonitrile as the main components) (solid content: 32 wt. %, average particle diameter: 5 $\mu$m, and voidage: 92%) | 30 |

-continued

| | Parts by Weight |
|---|---|
| Styrene-butadiene copolymer latex (solid content: 47.5 wt. %) | 5 |
| Water | 60 |

The thus prepared insulating layer coating liquid was coated on a sheet of high quality paper serving as a support, and dried in such a fashion that the deposition amount of the coating liquid was 5 g/$m^2$ on a dry basis. Thus, a non-expandable insulating layer was provided on the support.

(Formation of Thermosensitive Coloring Layer)

A mixture of the following components was separately dispersed and pulverized in a sand mill until the average particle size reached 2.0 $\mu$m or less, thereby obtaining a Liquid A and a Liquid B:

[Liquid A]

| | Parts by Weight |
|---|---|
| 3-butylamino-6-methyl-7-anilinofluoran | 20 |
| 10% aqueous solution of polyvinyl alcohol | 20 |
| Water | 60 |

[Liquid B]

| | Parts by weight |
|---|---|
| 4-hydroxy-4'-isopropoxy-diphenylsulfone | 10 |
| 10% aqueous solution of polyvinyl alcohol | 25 |
| Calcium carbonate | 15 |
| Water | 50 |

One part by weigh of the Liquid A and eight parts by weight of the Liquid B were mixed and stirred, so that a thermosensitive coloring layer coating liquid was prepared.

On the above obtained insulating layer, the thermosensitive coloring layer coating liquid was coated and dried in such a fashion that the deposition amount of the coating liquid was 5 g/$m^2$ on a dry basis. Then, the surface of the coated layer was subjected to super calendering to have a surface smoothness of 600 to 700 sec in terms of Bekk's smoothness.

(Formation of Thermosensitive Adhesive Layer)

On the back side of the support, opposite to the side of the thermosensitive coloring layer with respect to the support, a commercially available thermosensitive adhesive "DLA-1" (Trademark), made by Dainippon Ink and Chemical, Inc. with a solid content of 50 wt. % was coated and dried in such a fashion that the deposition amount of the adhesive was 25 g/$m^2$ on a dry basis.

Thus, a liner-less thermosensitive adhesive label No. 1 for use in the present invention was obtained.

Figure 20:
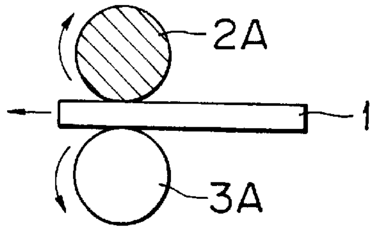
FIGS. 20 through 23 are schematic cross-sectional view of heat-activating apparatuses employed in Examples 1 to 12 and Comparative Examples 1 to 4.

Using a heat-activating apparatus as shown in FIG. 20 for heat-activating the thermosensitive adhesive label, the adhesive label 1 (No. 1) was caused to pass through a nip between a heating medium 2A in the form of a roll and a pressure-application member 3A in the form of a roll, with bringing the thermosensitive adhesive layer into contact with the surface of the heating medium 2A. In this case, the heating medium 2A and the pressure-application member 3A were silicone-resin-coated rolls with a diameter of 20 mm. The peel strength of a silicone-resin-coated surface portion of the heating medium 2A with respect to the thermosensitive adhesive layer was 0.5 g/nm, and the spring type hardness of a surface portion of the pressure-application member 3A was 20° when measured using a spring type hardness tester type A in accordance to JIS K6301.

Thus, the thermosensitive adhesive layer of the thermosensitive adhesive label No. 1 was heat-activated.

EXAMPLE 2

The procedure for heat-activating the thermosensitive adhesive layer of the thermosensitive adhesive label No. 1 as in Example 1 was repeated except that the silicone-resin-coated pressure-application roll 3A for use in the heat-activating apparatus as shown in FIG. 20 was replaced by a sponge roll with a diameter of 20 mm and a spring type hardness of 70° when measured using a spring type hardness tester type C in accordance to JIS K6301.

Thus, the thermosensitive adhesive layer of the thermosensitive adhesive label No. 1 was heat-activated.

EXAMPLE 3

The procedure for heat-activating the thermosensitive adhesive layer of the thermosensitive adhesive label No. 1 as in Example 1 was repeated except that the silicone-resin-coated pressure-application roll 3A for use in the heat-activating apparatus as shown in FIG. 20 was replaced by an acrylonitrile-butadiene robber (NBR) roll with a diameter of 20 mm and a spring type hardness of 60° when measured using a spring type hardness tester type A according to JIS K6301.

Thus, the thermosensitive adhesive layer of the thermosensitive adhesive label No. 1 was heat-activated.

EXAMPLE 4

The procedure for heat-activating the thermosensitive adhesive layer of the thermosensitive adhesive label No. 1 as in Example 1 was repeated except that the heat-activating apparatus shown in FIG. 20 as employed in Example 1 was modified in such a manner that the silicone-resin-coated pressure-application roll 3A was detachable from the silicone-resin-coated heat-application roll 2A when the thermosensitive adhesive layer of the label was not subjected to heat activation and attachable thereto when the thermosensitive adhesive layer was heat-activated.

Thus, the thermosensitive adhesive layer of the thermosensitive adhesive label No. 1 was heat-activated.

EXAMPLE 5

The procedure for preparation of the thermosensitive adhesive label No. 1 as in Example 1 was repeated except that the aqueous dispersion of minute void particles for use in the coating liquid for formation of the insulating layer in Example 1 was replaced by urea-formaldehyde resin with a solid content of 25 wt. %, so that a thermosensitive adhesive label No. 2 for use in the present invention was prepared.

The thermosensitive adhesive label No. 2 was heat-activated in the same manner using the same heat-activating apparatus as in Example 1.

EXAMPLE 6

The procedure for preparation of the thermosensitive adhesive label No. 1 as in Example 1 was repeated except that the non-expandable insulating layer as employed in Example 1 was not provided on the support, so that a thermosensitive adhesive label No. 3 for use in the present invention was prepared.

The thermosensitive adhesive label No. 3 was heat-activated in the same manner using the same heat-activating apparatus as in Example 1.

EXAMPLE 7

The procedure for preparation of the thermosensitive adhesive label No. 1 as in Example 1 was repeated except that the Liquid B used for the preparation of the thermosensitive coloring layer coating liquid in Example 1 was replaced by a Liquid C with the following formulation:

[Liquid C]

| | Parts by Weight |
|---|---|
| 4-hydroxy-4-isopropoxy-diphenylsulfone | 10 |
| Di(p-methylbenzyl) oxalate | 3 |
| 10% aqueous solution of polyvinyl alcohol | 25 |
| Calcium carbonate | 15 |
| Water | 47 |

Thus, a thermosensitive adhesive label No. 4 for use in the present invention was prepared.

Then, the thermosensitive adhesive label No. 4 was heat-activated in the same manner using the same heat-activating apparatus as in Example 1.

EXAMPLE 8

The procedure for preparation of the thermosensitive adhesive label No. 4 as in Example 7 was repeated except that di(p-methylbenzyl) oxalate for use in the formulation for the Liquid C in Example 7 was replaced by p-benzylbiphenyl, so that a thermosensitive adhesive label No. 5 for use in the present invention was prepared.

Then, the thermosensitive adhesive label No. 5 was heat-activated in the same manner using the same heat-activating apparatus as in Example 1.

EXAMPLE 9

Figure 21:
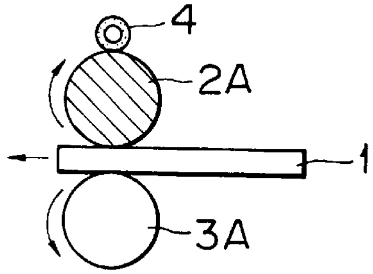

Using a heat-activating apparatus as shown in FIG. 21 for heat-activating the thermosensitive adhesive label, the adhesive label 1 (No. 1 prepared in Example 1) was caused to pass through a nip between a heating medium 2A in the form of a roll and a pressure-application member 3A in the form of a roll, with bringing the thermosensitive adhesive layer into contact with the surface of the heating medium 2A. In this case, the heating medium 2A and the pressure-application member 3A were silicone-resin-coated rolls with a diameter of 20 mm. The peel strength of a silicone-resin-coated surface portion of the heating medium 2A with respect to the thermosensitive adhesive layer was 0.5 g/mm, and the spring type hardness of a surface portion of the pressure-application member 3A was 20° when measured using a spring type hardness tester type A in accordance to JIP K6301.

Further, in the apparatus of FIG. 21, a commercially available silicone oil "KF-96" (Trademark), made by Shin-Etsu Chemical Co., Ltd. was applied to the surface portion of the heating medium 2A (heat-application roll) in an amount of 0.02 g/m$^2$ using a silicone-oil-application roll 4 which was disposed in contact with the heating medium 2A.

Thus, the thermosensitive adhesive layer of the thermosensitive adhesive label No. 1 was heat-activated.

EXAMPLE 10

Figure 22:
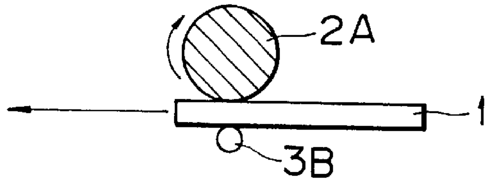

Using a heat-activating apparatus as shown in FIG. 22 for heat-activating the thermosensitive adhesive label, the adhesive label 1 (No. 1 prepared in Example 1) was caused to pass through a nip between a heating medium 2A in the form of a roll and a pressure-application member 3B in the form of a bar, with bringing the thermosensitive adhesive layer into contact with the surface of the heating medium 2A. In this case, the heating medium 2A was a silicone-resin-coated roll with a diameter of 20 mm, and the pressure-application member 3B was a Teflon bar. The peel strength of a silicone-resin-coated surface portion of the heating medium 2A with respect to the thermosensitive adhesive layer was 0.5 g/mm, and the spring type hardness of a surface portion of the pressure-application member 3B was 90° when measured using a spring type hardness tester type A in accordance wit JIS K6301.

Thus, the thermosensitive adhesive layer of the thermosensitive adhesive label no. 1 was heat-activated.

EXAMPLE 11

Figure 23:
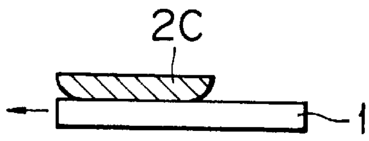

Using a heat-activating apparatus as shown in FIG. 23 for heat-activating the thermosensitive adhesive label, the adhesive label 1 (No. 1 prepared in Example 1) was caused to pass over a heating medium 2C in the form of a plate, with bringing the thermosensitive adhesive layer into contact with the surface of the heating medium 2C. In this case, the heating medium 2C was a silicone-resin-coated plate (80×100 mm). The peel strength of a silicone-resin-coated surface portion of the heating medium 2C with respect to the thermosensitive adhesive layer was 0.5 g/mm.

Thus, the thermosensitive adhesive layer of the thermosensitive adhesive label No. 1 heat-activated.

EXAMPLE 12

The procedure for heat-activating the thermosensitive adhesive layer of the thermosensitive adhesive label No. 1 as in Example 1 was repeated except that the silicone-resin-coated pressure-application roll 3A comprising a surface portion with a spring type hardness of 20° (type A) for use in the heat-activating apparatus as shown in FIG. 20 in Example 1 was replaced by a silicone-resin-coated pressure-application roll comprising a surface portion with a spring type hardness of 60° when measured using a spring type hardness tester type A according to JIS K6301.

Further, the thermosensitive adhesive label No. 1 was passed through a nip between the heating medium 2A and the pressure-application member 3A with the thermosensitive adhesive layer being brought into contact with the pressure-application member 3A. The pressure-application member 3A was heated by thermal conduction from the heating medium 2A, so that the pressure-application member 3A was also considered to serve as a heating medium in this case. The peel strength of the silicone-resin-coated surface portion of the pressure-application member 3A with respect to the thermosensitive adhesive layer was 0.5 g/mm.

Thus, the thermosensitive adhesive layer of the thermosensitive adhesive label No. 1 was heat-activated.

COMPARATIVE EXAMPLE 1

The procedure for heat-activating the thermosensitive adhesive layer of the thermosensitive adhesive label No. 1 as in Example 1 was repeated except that the silicone-resin-coated heat-application roll 2A for use in the heat-activating apparatus as shown in FIG. 20 in Example 1 was replaced by an acrylonitrile-butadiene rubber (NBR) roll with a diameter of 20 mm and a peel strength of 15 g/mm with respect to the thermosensitive adhesive layer.

Thus, the thermosensitive adhesive layer of the thermosensitive adhesive label No. 1 was heat-activated.

COMPARATIVE EXAMPLE 2

Using a heat-activating apparatus as shown in FIG. 21 for heat-activating the thermosensitive adhesive label, the adhesive label 1 (No. 1 prepared in Example 1) was caused to pass through a nip between a heating medium 2A in the form of a roll and a pressure-application member 3A in the form of a roll, with bringing the thermosensitive adhesive layer into contact with the surface of the heating medium 2A. In this case, the heating medium 2A was an acrylonitrile-butadiene rubber (NBR) roll with a diameter of 20 mm and a peel strength of 15 g/mm with respect to the thermosensitive adhesive layer. The pressure-application member 3A was a silicone-resin-coated roll with a diameter of 210 mm and a spring type hardness of 20° when measured using a spring type hardness tester type A in accordance wot JIS K6301.

Further, a commercially available silicone oil "KF-96" (Trademark), made by Shin-Etsu Chemical Co., Ltd. was applied to the surface portion of the heating medium 2A (heat-application roll) in an amount of 0.15 g/m$^2$ using a silicone-oil-application roll 4 which was disposed in contact with the heating medium 2A.

Thus, the thermosensitive adhesive layer of the thermosensitive adhesive label No. 1 was heat-activated.

COMPARATIVE EXAMPLE 3

The procedure for heat-activating the thermosensitive adhesive layer of the thermosensitive adhesive label No. 1 as in Example 1 was repeated except that the silicone-resin-coated heat-application roll 2A for use in the heat-activating apparatus as shown in FIG. 20 in Example 1 was replaced by a Teflon-coated roll with a diameter of 20 mm and a peel strength of 3 g/mm with respect to the thermosensitive adhesive layer.

Thus, the thermosensitive adhesive layer of the thermosensitive adhesive label No. 1 was heat-activated.

COMPARATIVE EXAMPLE 4

The procedure for heat-activating the thermosensitive adhesive layer of the thermosensitive adhesive label No. 1 as in Example 1 was repeated except that the silicone-resin-coated heat-application roll 2A for use in the heat-activating apparatus as shown in FIG. 20 in Example 1 was replaced by a Teflon-coated roll with a diameter of 20 mm and a peel strength of 9.5 g/mm with respect to the thermosensitive adhesive layer.

Thus, the thermosensitive adhesive layer of the thermosensitive adhesive label No. 1 was heat-activated.

Table 1 shows heat-activating conditions of the heat activation methods employed in Examples 1 to 12 and Comparative Examples 1 to 4.

Each heat activation method of the thermosensitive adhesive label employed in Examples 1 to 12 and Comparative Examples 1 to 4 was evaluated with respect to the following aspects:

(1) Peel Strength of Surface Portion of Heating Medium With Respect to Thermosensitive Adhesive Layer Each of the thermosensitive adhesive labels Nos. 1 to 5 in a non-heat-activated state was cut, so that a sample label with a width of 20 mm was prepared.

Each sample label was heat-activated at 90° C. for one minute in a temperature-controlled dryer, thereby making the thermosensitive adhesive layer adhesive.

A sheet made of the same material as employed in a surface portion of the heating medium was applied to the thermosensitive adhesive layer of the sample label, and thereafter a roller was allowed to run over the laminated material both ways with the application thereto of a load of 2 kg twice. Then, a tensile strength was measured by peeling the sheet from the thermosensitive adhesive layer under T-peel condition at a peeling speed of 300 mm/min, using a commercially available tensile strength and compression tester "SDT-50" (Trademark), made by Imada Seisakusho Co., Ltd.

The results are shown in Table 1.

(2) Adhesion of Thermosensitive Adhesive Layer by Heat Activation

The adhesion of the thermosensitive adhesive layer which was heat activated by each heat activation method was examined by touching the adhesive layer with fingers. Then, the adhesion of the thermosensitive adhesive layer was evaluated on the following scale:

A: The adhesion was very strong and considered to be preferable in practical use.

B: The adhesion was sufficient and the employed heat activation method was acceptable in practical use.

C: The adhesion was weak, and the employed heat activation method was not acceptable in practical use.

D: The thermosensitive adhesive layer was not provided with any adhesion, so that the employed heat activation method was not acceptable in practice.

The results are shown in Table 2.

(3) Transferring of Adhesive to Heating Medium

A sample (5 cm×8 cm) was prepared from each of the thermosensitive adhesive labels Nos. 1 to 5. The deposition of the thermosensitive adhesive on the surface portion of the heating medium was visually inspected after one sample was subjected to heat activation, and after 50 samples were continuously subjected to heat activation.

Then, the transferring of the thermosensitive adhesive to the heating medium was evaluated on the following scale:

A: No adhesive was observed on the surface portion of the heating medium by visual inspection.

B: A slight amount of adhesive was observed on the surface portion of the heating medium by visual inspection, but the employed heat activation method was acceptable in practical use.

C: The adhesive transferred to the surface portion of the heating medium was noticeable, and the employed heat activation method was not acceptable in practical use.

D: The thermosensitive adhesive layer was almost entirely transferred to the surface portion of the heating medium, so that the employed heat activation method was not acceptable in practice.

The results are shown in Table 2.

(4) Background Density of Thermosensitive Coloring Layer in the Course of Heat Activation of Thermosensitive Adhesive Layer The background density of the thermosensitive coloring layer was measured using a McBeth densitometer RD-914 when the thermosensitive adhesive layer was heat activated by each heat activation method.

The results are shown in Table 2.

(5) Dynamic Coloring Density of Thermosensitive Coloring Layer

Each thermosensitive adhesive label was loaded in a printing test apparatus equipped with a commercially available thin film heat (made by Matsushita Electronic Components Co., Ltd.), and images were thermally printed on the thermosensitive coloring layer under the conditions that the applied electric power was 0.6 W/dot, the period for one line was 10 msec/line and the scanning density was 8×7.7 dot/mm, with the pulse width changed to 0.4 msec and 0.5 msec.

The coloring density of the image recorded on the thermosensitive coloring layer was measured using a McBeth densitometer RD-914.

The results are shown in Table 2.

TABLE 1

| | Heating Medium | | | | Pressure-application Member | | | | Peel Strength | | Amount of |
|---|---|---|---|---|---|---|---|---|---|---|---|
| Example No. | Form | Material of Surface Portion | Size | Surface Temper-ature | Mode (*) | Material of surface portion | Size | Spring type hardness | of Heating Medium from Adhesive Layer (g/mm) | Adhesion of Adhesive Layer (g/25 mm) | Silicone Oil Applied to Heating Medium ($g/cm^2$) |
| Ex.1 | Roll | Silicone resin | 20 mmφ | 120° C.<br>70° C.<br>55° C. | 1 | Silicone resin | 20 mmφ | 20* (Type A) | 0.5 | 400 | — |
| Ex. 2 | Roll | Silicone resin | 20 mmφ | 120° C. | 1 | Sponge | 20 mmφ | 70* (Type C) | 0.5 | 400 | — |
| Ex. 3 | Roll | Silicone resin | 20 mmφ | 120° C. | 1 | NBR | 20 mmφ | 60° (Type A) | 0.5 | 400 | — |
| Ex. 4 | Roll | Silicone resin | 20 mmφ | 120° C. | 2 | Silicone resin | 20 mmφ | 20* (Type A) | 0.5 | 400 | — |
| Ex. 5 | Roll | Silicone resin | 20 mmφ | 120° C. | 1 | Silicone resin | 20 mmφ | 20* (Type A) | 0.5 | 400 | — |
| Ex. 6 | Roll | Silicone resin | 20 mmφ | 120° C. | 1 | Silicone resin | 20 mmφ | 20* (Type A) | 0.5 | 400 | — |
| Ex. 7 | Roll | Silicone resin | 20 mmφ | 120° C. | 1 | Silicone resin | 20 mmφ | 20* (Type A) | 0.5 | 400 | — |
| Ex. 8 | Roll | Silicone resin | 20 mmφ | 120° C. | 1 | Silicone resin | 20 mmφ | 20* (Type A) | 0.5 | 400 | — |

TABLE 1-continued

| Example No. | Heating Medium: Form | Heating Medium: Material of Surface Portion | Heating Medium: Size | Heating Medium: Surface Temperature | Pressure-application Member: Mode (*) | Pressure-application Member: Material of surface portion | Pressure-application Member: Size | Pressure-application Member: Spring type hardness | Peel Strength of Heating Medium from Adhesive Layer (g/mm) | Adhesion of Adhesive Layer (g/25 mm) | Amount of Silicone Oil Applied to Heating Medium ($g/cm^2$) |
|---|---|---|---|---|---|---|---|---|---|---|---|
| Ex. 9 | Roll | Silicone resin | 20 mmφ | 120° C. | 1 | Silicone resin | 20 mmφ | 20* (Type A) | 0.5 | 400 | 0.02 $g/m^2$ |
| Ex. 10 | Roll | Silicone resin | 20 mmφ | 120° C. | 1 | Teflon (Bar) | 8 mmφ | 90* (Type A) | 0.5 | 400 | — |
| Ex. 11 | Plate | Silicone resin | 80 mmx 100 mm | 120° C. | — | — | — | — | 0.5 | 400 | — |
| Ex. 12 | Roll | Silicone resin | 20 mmφ | 120° C. | 1 | Silicone resin | 20 mmφ | 60* (Type A) | 0.5(**) | 400 | — |
| Comp. Ex. 1 | Roll | NBR | 20 mmφ | 120° C. | 1 | Silicone resin | 20 mmφ | 20* (Type A) | 15.0 | 400 | — |
| Comp. Ex. 2 | Roll | NBR | 20 mmφ | 120° C. | 1 | Silicone resin | 20 mmφ | 20* (Type A) | 15.0 | 400 | 0.15 $g/m^2$ |
| Comp. Ex. 3 | Roll | Teflon | 20 mmφ | 120° C.<br>70° C.<br>55° C. | 1 | Silicone resin | 20 mmφ | 20* (Type A) | 3.0 | 400 | — |
| Comp. Ex. 4 | Roll | Teflon | 20 mmφ | 120° C. | 1 | Silicone resin | 20 mmφ | 20* (Type A) | 9.5 | 400 | — |

(*) Mode 1: The pressure-application member is detachable from the heating medium while the thermosensitive adhesive layer of the label is not subjected to heat activation.
Mode 2: The pressure-application member is always in contact with the heating medium.
(**) This peel strength is that of a silicone-resin-coated surface portion of the pressure-application member with respect to the thermosensitive adhesive layer.

TABLE 2

| Example No. | Color Initiation Temperature) - (Heat Activation Temperature) | Heat - activating Speed (mm/sec) | Surface Temperature of Heating Medium | Adhesion of Adhesion Layer after Heat Activation | Transferring of Adhesive Layer to Heating Medium: After heat activation of one label | Transferring of Adhesive Layer to Heating Medium: After continuous heat activation of 50 labels | Background Density: Before heat activation | Background Density: After heat activation | Dynamic Coloring Density: 0.4 ms | Dynamic Coloring Density: 0.5 ms |
|---|---|---|---|---|---|---|---|---|---|---|
| Ex. 1 | 40° C. | 100 | 120° C.<br>70° C.<br>55° C. | A<br>B<br>C | A<br>A<br>A | A<br>A<br>A | 0.07<br>0.07<br>0.07 | 0.07<br>0.07<br>0.07 | 0.72 | 1.15 |
| Ex. 2 | 40° C. | 100 | 120° C. | A | A | A | 0.07 | 0.07 | 0.71 | 1.15 |
| Ex. 3 | 40° C. | 100 | 120° C. | A | A | A | 0.07 | 0.07 | 0.71 | 1.14 |
| Ex. 4 | 40° C. | 100 | 120° C. | A | A | A | 0.07 | 0.07 | 0.72 | 1.14 |
| Ex. 5 | 40° C. | 100 | 120° C. | A | A | A | 0.07 | 0.08 | 0.65 | 1.06 |
| Ex. 6 | 40° C. | 100 | 120° C. | A | A | A | 0.07 | 0.07 | 0.60 | 1.01 |
| Ex. 7 | 15° C. | 100 | 120° C. | A | A | A | 0.07 | 0.10 | 0.78 | 1.19 |
| Ex. 8 | 8° C. | 100 | 120° C. | A | A | A | 0.07 | 0.13 | 0.93 | 1.22 |
| Ex. 9 | 40° C. | 100 | 120° C. | B | A | A | 0.07 | 0.07 | 0.72 | 1.14 |
| Ex. 10 | 40° C. | 100 | 120° C. | A | A | A | 0.07 | 0.10 | 0.73 | 1.16 |
| Ex. 11 | 40° C. | 50 | 120° C. | B | A | B | 0.07 | 0.11 | 0.72 | 1.15 |
| Ex. 12 | 40° C. | 100 | 120° C. | A | A | A | 0.07 | 0.08 | 0.71 | 1.15 |
| Comp. Ex. 1 | 40° C. | 100 | 120° C. | D | D | D | 0.07 | 0.08 | 0.72 | 1.16 |
| Comp. Ex. 2 | 40° C. | 100 | 120° C. | D | A | A | 0.07 | 0.07 | 0.72 | 1.15 |
| Comp. Ex. 3 | 40° C. | 100 | 120° C.<br>70° C.<br>55° C. | D<br>B<br>C | D<br>B<br>A | D<br>D<br>C | 0.07<br>0.07<br>0.07 | 0.07<br>0.07<br>0.07 | 0.73 | 1.15 |
| Comp. Ex. 4 | 40° C. | 100 | 120° C. | B | C | D | 0.07 | 0.08 | 0.73 | 1.15 |

As previously explained, the heat activation method of the present invention for activating the thermosensitive adhesive layer of the thermosensitive adhesive label is excellent from the viewpoint of workability, safety and convenience. To be more specific, sufficient adhesion can be imparted to the thermosensitive adhesive layer by the heat activation method without transferring to the surface portion of the heating medium although the heating medium is brought into contact with the thermosensitive adhesive layer. Such excellent results can be exhibited even though the heat activating conditions, such as a heat activating speed and a surface temperature of the heating medium vary.

Further, the background density and the dynamic coloring density on the thermosensitive coloring layer of the thermosensitive recording adhesive label are not impaired by the heat activation of the thermosensitive adhesive layer.

The above-mentioned heat activation method of the present invention can be surely carried out using the heat-activating apparatus of the present invention. The heat-activating apparatus is made compact and light in size and economical because of small energy consumption, and it can be manufactured at low cost.

Japanese Patent Application No. 8-034228 filed Jan. 30, 1996, Japanese Patent Application No. 8-265102 filed Sep. 17, 1996, and Japanese Patent Application No. 9-27340 filed Jan. 28, 1997 are hereby incorporated by reference.

What is claimed is:

1. An apparatus for heat-activating a thermosensitive adhesive label comprising a support and a thermosensitive adhesive layer which is formed on said support and is not adhesive at room temperature, so as to make said thermosensitive adhesive layer adhesive with the application of heat thereto, comprising:

transporting means for transporting said thermosensitive adhesive label; and heating means comprising a heating medium, adapted for heating said thermosensitive adhesive layer of said thermosensitive adhesive label by bringing said thermosensitive adhesive layer into contact with a surface portion of said heating medium, at least said surface portion of said heating medium consisting essentially of a silicone resin and having a peel strength of 2 g/mm or less with respect to said thermosensitive adhesive layer, which is measured by applying said thermosensitive adhesive layer to said surface portion of said heating medium, heating said thermosensitive adhesive layer to 90° C. for one minute under the application of a load of 2 kg thereto, and measuring the force required to peel said thermosensitive adhesive layer from said surface portion of said heating medium under T-peel condition at room temperature at a peeling speed of 30 mm/minute, wherein said thermosensitive adhesive layer has an adhesion of 200 g/25 mm or more, which is measured by applying said thermosensitive adhesive layer to a plate made of SUS-304, heating said thermosensitive adhesive layer to 90° C. for one minute under the application of a load 2 kg thereto, and measuring the tensile strength of said thermosensitive adhesive layer when said thermosensitive adhesive layer is peeled from said SUS-304 plate at a peeling speed of 300 mm/min at a peeling angle of 180°.

2. A label printer for printing an image on a thermosensitive recording adhesive layer comprising a support, an image-receiving label formed on the front side of said support, a thermosensitive adhesive layer which is formed on the back side of said support, opposite to said image-receiving layer with respect to said support, and is not adhesive at room temperature and can become adhesive by heat activation with the application of heat thereto, comprising:

label transporting means for transporting said thermosensitive recording adhesive label;

printing means for printing an image on said image-receiving layer of said thermosensitive recording adhesive label with the application of heat thereto;

cutting means for cutting said thermosensitive recording adhesive label to a predetermined length; and heat-activating means for activating said thermosensitive adhesive layer of said thermosensitive recording adhesive label by bringing said thermosensitive adhesive layer into contact with a surface portion of a heating medium for said heat activation of said thermosensitive adhesive layer, at least said surface portion of said heating medium consisting essentially of a silicone resin and having a peel strength of 2 g/mm or less with respect to said thermosensitive adhesive layer, which is measured by applying said thermosensitive adhesive layer to said surface portion of said heating medium, heating said thermosensitive adhesive layer to 90° C. for one minute under the application of a load of 2 kg thereto, and measuring the force required to peel said thermosensitive adhesive layer from said surface portion of said heating medium under T-peel condition at room temperature at a peeling speed of 300 mm/minute, wherein said thermosensitive adhesive layer of said thermosensitive recording adhesive label has an adhesion of 200 g/25 mm or more, which is measured by applying said thermosensitive adhesive layer to a plate made of SUS-304, heating said thermosensitive adhesive layer to 90° C. for one minute under the application of a load of 2 kg thereto, and measuring the tensile strength of said thermosensitive adhesive layer when said thermosensitive adhesive layer is peeled from said SUS-304 plate at a peeling speed of 300 mm/min at a peeling angle of 180°.

* * * * *

UNITED STATES PATENT AND TRADEMARK OFFICE

CERTIFICATE OF CORRECTION

PATENT NO. : 6,298,894 B1
DATED : October 9, 2001
INVENTOR(S) : Masanaka Nagamoto et al.

It is certified that error appears in the above-identified patent and that said Letters Patent is hereby corrected as shown below:

Column 4,
Line 55, "are a schematic" should read -- are schematic --.
Line 58, "is a" should read -- are --;
Line 65, "view" should read -- views --.

Column 14,
Line 67, "preferable" should read -- preferably --.

Column 15,
Line 6, "decreases" should read -- decrease --.

Column 19,
Line 6, "g/nm" should read -- g/mm --.

Column 20,
Line 63, "JIP" should read -- JIS --.

Column 22,
Line 22, "210 mm" should read -- 20 mm --;
Line 24, "wot" should read -- to --.

Columns 25 and 26,
Table 2, Column 5, "adhesion" should read -- adhesive --;
Table 2, Column 10, "0.93" should read -- 0.83 --.

Signed and Sealed this

Sixth Day of August, 2002

*Attest:*

JAMES E. ROGAN

*Attesting Officer*

*Director of the United States Patent and Trademark Office*